United States Patent [19]

Van Kemenade et al.

[11] Patent Number: 4,800,319

[45] Date of Patent: Jan. 24, 1989

[54] LOW-PRESSURE MERCURY VAPOR DISCHARGE LAMP

[75] Inventors: Johannes T. C. Van Kemenade; Johannes T. W. De Hair, both of Eindhoven; Everhardus G. Berns, Geldrop, all of Netherlands

[73] Assignee: U.S. Philips Corporation, New York, N.Y.

[21] Appl. No.: 814,284

[22] Filed: Dec. 23, 1985

Related U.S. Application Data

[63] Continuation of Ser. No. 598,957, Apr. 11, 1984, abandoned.

[30] Foreign Application Priority Data

Apr. 25, 1983 [NL] Netherlands ........................ 8301445

[51] Int. Cl.$^4$ ........................ H01J 1/62; H01J 63/04; C09K 11/08

[52] U.S. Cl. .................................... 313/487; 313/489; 252/301.4 R

[58] Field of Search ............... 313/486, 487, 489, 493, 313/112, 636; 252/301.4 R, 301.4 H

[56] References Cited

U.S. PATENT DOCUMENTS

| | | | |
|---|---|---|---|
| 3,430,090 | 2/1969 | Vodoklys et al. | 313/486 |
| 3,458,237 | 12/1970 | Schreurs | 313/489 |
| 3,541,489 | 11/1970 | Sudoski et al. | 313/489 |
| 3,937,998 | 2/1976 | Verstegen et al. | 313/487 |
| 4,176,299 | 11/1979 | Thornton, Jr. et al. | 313/487 |
| 4,216,408 | 8/1980 | Verstegen et al. | 313/486 |
| 4,267,485 | 5/1981 | Morakami et al. | 313/486 |
| 4,319,101 | 3/1982 | Looye et al. | 313/486 |
| 4,524,299 | 6/1985 | Preston | 313/487 |

FOREIGN PATENT DOCUMENTS 0094132 11/1983 European Pat. Off. .

OTHER PUBLICATIONS

Commission International de L'Eclairage Publications CIE No. 13.2 (TC-3.2), (1974) and CIE No. 15 (E-1.3.1) (1971).

J. J. Rennilson, Optical Spectra, Oct. 1980, pp. 63–66.

*Primary Examiner*—S. Leon Bashore
*Assistant Examiner*—Michael K. Boyer
*Attorney, Agent, or Firm*—John C. Fox

[57] ABSTRACT

A low-pressure mercury vapor discharge lamp having a very satisfactory color rendition, (R(a,8)≧85), a color temperature of 2300–3300 K and a color point on or near the Planckian curve. The lamp is provided with a luminescent layer comprising:

a. a luminescent alkaline earth metal halophosphate activated by $Sb^{3+}$ and $Mn^{2+}$ having a color temperature of 2900–5000 K;

b. a luminescent material activated by $Eu^{2+}$ with an emission maximum van 470–500 nm and a half-value width of at most 90 nm, and c. a luminescent rare earth metal metaborate activated by $Ce^{3+}$ and $Mn^{2+}$, having a fundamental lattice $Ln(Mg,Zn,Cd)\ B_5O_{10}$, in which Ln represents the elements Y, La and/or Gd, which borate has red $Mn^{2+}$ emission.

Further, the lamp is provided with means for absorbing blue radiation having wavelengths below 480 nm. Preferably, the luminescent layer further contains:

d. a luminescent material activated by $Tb^{3+}$ which exhibits green $Tb^{3+}$ emission.

Besides a very satisfactory color rendition at a low color temperature, these lamps have a high luminous flux and a high maintenance of the luminous flux during their life.

15 Claims, 2 Drawing Sheets

LOW-PRESSURE MERCURY VAPOR DISCHARGE LAMP

This is a continuation of application Ser. No. 598,957, filed Apr. 11, 1984, now abandoned.

BACKGROUND OF THE INVENTION

The invention relates to a low-pressure mercury vapour discharge lamp having a very satisfactory colour rendition, a colour temperature of the emitted white light in the range of 2300 to 3300 K. and a colour point on or near the Planckian curve and provided with a gas-tight radiation-transparent envelope containing mercury and rare gas and with a luminescent layer containing a luminescent halophosphate and a luminescent material activated by bivalent europium.

The expression "a very satisfactory colour rendition" is to be understood to mean in the present description and the appended claims that the average colour rendering index R(a,8) (average value of the rendering indices of eight test colours as defined by the Commission Internationale d'Eclairage: Publication CIE, No. 13.2 (TC-3.2), 1974) has a value of at least 85.

The colour of visible radiation is characterized by the colour coordinates (x,y) determining the colour point in the colour triangle (see Publication CIE, No. 15 (E-1.3.1), 1971). Lamps for general illumination purposes should emit light which can be considered to be white. White radiation is found in the colour triangle at colour points located on the Planckian curve. This curve, which is also designated as the curve of the black body radiators and which will be denoted hereinafter as the curve P, comprises the colour points of the radiation emitted by a completely black body at different temperatures (the so-called colour temperature). A given colour temperature is allotted not only to a given point on the curve P, but also to radiation having colour coordinates located on a line intersecting the curve P at that point (see the said Publication CIE, No. 15). If this radiation has a colour point near the curve P, this radiation is also considered as white light having this given colour temperature. In the present description and the appended claims, the expression "a colour point near the curve P" is to be understood to mean that the distance of the colour point from the point on the curve P having the same colour temperature is at most 20 MPCD. MPCD (Minimum Perceptible Colour Difference) is the unit of colour difference (see the Publication of J. J. Rennilson in Optical Spectra, October 1980, page 63).

A large number of embodiments of low-pressure mercury vapour discharge lamps which have been known for many years and are frequently used contain a luminescent material chosen from the group of the alkaline earth metal halophosphates activated by $Sb^{3+}$ and $Mn^{2+}$. These lamps have the advantage that they are inexpensive and emit a satisfactorily high luminous flux. A great disadvantage of these lamps, however, is that their colour rendition leaves much to be desired. They generally have R(a,8) values of the order of 50 to 60 and only in lamps at a high colour temperature (for example 5000 K.) is a value of R(z,8) of approximately 75 reached, which is not yet considered to be a satisfactory colour rendition.

Lamps with which a very high colour rendition is reached have been known for a long time. These lamps are provided with special luminescent materials, i.e. a tin-activated red-luminescing material on the basis of a strontium orthophosphate most frequently combined with a blue-emitting halophosphate activated by $Sb^{3+}$, in particular such a strontium halophosphate. The strontium orthophosphate luminesces in a very wide band which extends into the deep red. These known lamps have the disadvantage inherent in the use of the strontium orthophosphate of a comparatively small luminous flux and of a poor maintenance of the luminous flux during the life of the lamp. It has been found that, because of the latter disadvantage, this strontium orthophosphate is of little practical use when subjected to a higher load resulting from mercury discharge radiation.

A lamp of the kind described in the opening paragraph is known from German Patent Application No. 2,848,726. This lamp which has a very satisfactory colour rendition contains, like the aforementioned lamp type, a red-luminescing tin-activated strontium orthophosphate and further a borate-phosphate activated by bivalent europium, which has an emission band with a maximum at approximately 480 nm and a half-value width of approximately 85 nm. Preferably, a luminescent alkaline earth metal halophosphate is further used in the luminescent layer of this lamp. Due to the use of the luminescent strontium orthophosphate, this known lamp again has the disadvantage of a comparatively low luminous flux and in particular of a poor maintenance of the luminous flux during the life of the lamp. The known lamp further has the disadvantage that a very satisfactory colour rendition is reached only at colour temperature above approximately 3500 K. Embodiments of the known lamp at very low colour temperatures (below 3000 K.) are not possible.

SUMMARY OF THE INVENTION

The invention has for its object to provide low-pressure mercury vapour discharge lamps having a very satisfactory colour rendition at a low colour temperature of the emitted radiation while avoiding or substantially avoiding the disadvantages of the known lamps.

For this purpose, according to the invention, a low-pressure mercury vapour discharge lamp of the kind mentioned in the opening paragraph is characterized in that the luminescent layer comprises:

a. at least one luminescent alkaline earth metal halophosphate activated by trivalent antimony and bivalent manganese, having a colour temperature of the emitted radiation of 2900 to 5000 K., b. at least one luminescent material activated by bivalent europium, having an emission maximum in the range of 470 to 500 nm and a half-value width of the emission band of at most 90 nm, and c. a luminescent rare earth metal metaborate activated by trivalent cerium and bivalent manganese, having a monoclinic crystal structure, whose fundamental lattice satisfies the formula $Ln(Mg,Zn,Cd)B_5O_{10}$, in which Ln represents at least one of the elements yttrium, lanthanum and gadolinium and in which up to 20 mol.% of the B can be replaced by Al and/or Ga, which metaborate exhibits red $Mn^{2+}$ emission, and in that the lamp is provided with means for absorbing at least in part blue radiation having wavelengths below 480 nm.

Experiments which have led to the invention have surprisingly shown that a very high value for R(a, 8) can also be obtained with an emission which has a considerably narrower band than that of the known luminescent strontium orthophosphate, but whose emission maximum is located at substantially the same point. It has been found that the emission from rare earth metal metaborate activated by $Ce^{3+}$ and $Mn^{2+}$ is very suitable for this purpose. This metaborate is known per se and is described in Dutch Patent Application No. 7905680 (PHN 9544) and 8100346 (PHN 9942). It has a fundamental lattice of monoclinic crystal structure according to the formule $Ln(Mg,Zn,Cd)B_5O_{10}$. In this formula Ln is at least one of the elements Y, La and Gd. In the borate up to 20 mol.% of the B can be replaced by Al and/or Ga, which, like the choice of the elements Mg, Zn and/or Cd, has only little influence on the luminescent properties. The Ce activator is incorporated at an Ln site (and may even occupy all the Ln sites) and absorbs the exciting radiation energy (mainly 254 nm in a low-pressure mercury vapour discharge lamp) and transmits it to the Mn activator, which is incorporated at an Mg (and/or Zn and/or Cd) site. The borate has a very efficient emission orginating from $Mn^{2+}$ in a band with a maximum at approximately 630 nm and a half-value width of approximately 80 nm.

In order to obtain values of R(a,8) of at least 85, in a lamp according to the invention the metaborate (the material c) has to be combined with a material activated by bivalent europium with an emission maximum in the range of 470 to 500 nm and a half-value width of the emission band of at most 90 nm (the material b) and with at least one luminescent halophosphate (the material a) chosen from the group of the Sb- and Mn-activated alkaline earth metal halophosphates.

With combinations of the luminescent materials a, b and c, lamps having a very satisfactory colour rendition can be manufactured for colour temperatures of approximately 3200 K. and higher. In order to obtain low to very low colour temperatures (down to at least 2300 K.), a lamp according to the invention has to be provided with means for absorbing at least in part blue radiation having wavelengths below 480 nm. The use of such means in a low-pressure mercury vapour discharge lamp provided with a luminescent material in all cases leads to a shift of the colour point of the radiation emitted by the lamp because the blue radiation originating from the mercury discharge and, as the case may be, also the blue radiation originating from the luminescent material are absorbed at least in part. This shift of the colour point due to blue absorption makes it possible to obtain colour temperatures in the range of 2300–3300 K., with lamps according to the invention, as will be explained more fully hereinafter.

An advantage of the lamps according to the invention is that the luminescent materials used are very efficient so that high luminous fluxes can be obtained. It has further been found that these materials exhibit a very favourable lamp behaviour. This means that when provided in a lamp, they retain their favourable luminescent properties and that they exhibit only a low decreses in luminous flux during the life of the lamp. This is also the case with a comparatively high radiation load, for example in lamps having a small diameter, for example 24 mm. It should be noted that the use of the known luminescent strontium orthophosphate—due to the strong decrease in luminous flux, especially at high loads—in practice mostly has remained limited to lamps having a large diameter (36 mm).

It has further been found that the use in lamps of the said metaborate leads not only to very high values for the general colour rendering index R(a, 8), but also to a very satisfactory rendition of a very large number of individual object colours. This results in that with lamps according to the invention, errors in the colour rendition due to disruption of metamery are completely or substantially completely avoided.

Preferably, a lamp according to the invention is characterized in that the luminescent material further contains a luminescent material activated by trivalent terbium (material d) which exhibits a green $Tb^{3+}$ emission. The use of the Tb-activated luminescent materials has the advantage that a larger colour temperature range for the lamps according to the invention becomes possible. In general, such a material is very desirable if lamps having a comparatively low colour temperature (from 2300 K.) with the said high value of R(a,8) should be obtained. Apart therefrom it has been found that also for higher colour temperatures, generally the most favourable results are obtained if a material with Tb emission is used. The Tb emission yields an additional degree of freedom, as a result of which optimization becomes more readily possible. Furthermore, the use of Tb-activated luminescent materials has the advantage that such green-luminescing materials are generally very efficient and contribute significantly to the luminous flux emitted by the lamp. As the material d use may be made, for example, of the known Tb-activated cerium-magnesium aluminates (see Dutch Patent Specification No. 160,869 (PHN 6604) or cerium aluminates (see Dutch Patent Application No. 7216765 (PHN 6654), which aluminates have a hexagonal crystal structure related to magneto-plumbite. It is also very advantageous to use a Ce- and Tb-activated metaborate whose fundamental lattice is the same as that of the metaborates with red $Mn^{2+}$ emission (the material c). In these known borates (see the afore mentioned Dutch Patent Application Nos. 7905680 and 8100346) Ce and Tb are incorporated at an Ln site and the exciting radiation is absorbed by the cerium and transmitted to the terbium activator. The said Tb-activated materials all have a very favourable lamp behaviour and especially a satisfactory maintenance of the high luminous flux during the operation of the lamps.

A preferred embodiment of a lamp according to the invention is characterized in that the luminescent metaborate c is further activated by trivalent terbium, the metaborate c being at the same time the material d, and satisfies the formula $$(Y,La,Gd)_{1-f-g}Ce_fTb_g(Mg,Zn,Cd)_{1-h}Mn_hB_5O_{10},$$

in which $$0.01 \leq f \leq 1-g$$

$$0.01 \leq g \leq 0.75$$

$$0.01 \leq h \leq 0.30$$

and in which up to 20 mol.% of the B can be replaced by Al and/or Ga. This lamp has the great advantage that both the red $Mn^{2+}$ emission and the green $Tb^{3+}$ emission are supplied by one luminescent material. Thus, the production of the lamps is of course simplified because a smaller number of luminescent materials are required. In these lamps, the desired relative red $Mn^{2+}$ and green $Tb^{3+}$ contributions can be adjusted by varying the concentrations of Mn and Tb in the metaborate. The value of the said relative contributions depends upon the desired colour point of the lamp, upon the luminescent materials a and b used and upon the extent of absorption of blue radiation. It is possible to prepare and to optimize one luminescent metaborate, in which the ratio of $Mn^{2+}$ to the $Tb^{3+}$ emission has a value near the average desired value and to carry out a correction in a given lamp application (depending upon the desired colour point) either with a small quantity of a red-or deeper red-luminescing metaborate or with a small quantity of a green-or deeper green-luminescing Tb-activated material. Of course, it is alternatively possible to optimize two luminescent metaborates, with which lamps having any desired colour temperatures can be obtained by the use of suitable mixtures of these two materials.

In a lamp according to the invention, the means for absorbing blue radiation can be constituted by the radiation-transparent envelope of the lamp. The envelope of the known low-pressure mercury vapour discharge lamps for general illumination purposes consists of glass which transmits visible radiation and has an absorption edge at 280–310 nm. This means that the usual glass does not substantially transmit ultraviolet radiation having wavelengths smaller than 280–310 nm. It has been found that glasses having an absorption edge at approximately 430–470 nm can be advantageously used for the glass envelope of lamps according to the invention. These yellow-coloured filter glasses, whose absorption properties can be influenced within certain limits by means of the glass composition, are known per se. It is also possible to use the conventional glass as lamp envelope for lamps according to the invention, in which event the absorption properties are obtained by providing a suitable lacquer layer on the envelope.

In an advantageous embodiment of a lamp according to the invention, the means for absorbing blue radiation are constituted by a yellow pigment. The use of yellow pigments in low-pressure mercury vapour discharge lamps is known per se. A very suitable pigment is the known nickel titanate (titanium dioxide containing small quantities of nickel oxide). The desired absorption properties of such a pigment can be adjusted by mixing this pigment with a white substance (for example barium sulphate). These pigments have the advantage that they generally are satisfactorily resistent to the mercury discharge.

The yellow pigment can be mixed with the luminescent materials of the luminescent layer. This has the advantage that the lamp can be manufactured in a simple manner because the luminescent materials can be provided in the lamp together with the pigment in one processing step.

It is alternatively possible to provide the pigment on the inner side of the lamp envelope as an absorption layer on which the luminescent layer is applied on the side facing the discharge. Such a double layer has the advantage that higher relative luminous fluxes can generally be obtained with the lamp.

A lamp according to the invention is to be preferred which is characterized in that the means for absorbing blue radiation are constituted by a luminescent aluminate activated by trivalent cerium having a garnet crystal structure according to the formula $$M_{3-j}Ce_jAl_{5-k-p}Ga_kSc_pO_{12},$$

in which M is at least one of the elements yttrium, gadolinium, lanthanum and lutetium and in which $$0.01 \leqq j \leqq 0.15$$

$$0 \leqq k \leqq 3$$

$$0 \leqq p \leqq 1.$$

The said garnet is a luminescent material known per se (see, for example, Appl. Phys. Letters, 11, 53, (1967) and J. O.S.A., 59, No. 1, 60 1969), which absorbs besides short-wave ultraviolet radiation especially also radiation having wavelengths between approximately 400 and 480 nm. The emission of this garnet consists of a wide band (half-value width approximately 110 nm) with a maximum at approximately 560 nm. The use of this luminescent garnet in lamps according to the invention as means for absorbing blue radiation has the great advantage that the absorbed radiation is not lost, but is converted into useful radiation with a high efficiency. Consequently, high luminous fluxes can be obtained. As appears from the aforementioned formula and conditions, as cation M one or more of the elements Y, Gd, La and Lu can be used in the garnet and the aluminium can be replaced within the aforementioned limits in part by gallium and/or scandium. The Ce activator replaces part of the M and is present in a concentration of 0.01 to 0.15. Ce contents lower than the said lower limit in fact lead to materials having an insufficient blue absorption. The Ce content is chosen to be not larger than 0.15 because with such high contents the garnet is not formed to a sufficient extent and undesired subphases are obtained.

Preferably, such a lamp according to the invention is characterized in that M in the garnet is yttrium and in that the garnet does not contain Ga and Sc (k=p=0). Such materials in fact have the most favourable absorption properties and yield the highest luminous fluxes.

In an advantageous embodiment of a lamp according to the invention, the garnet activated by $Ce^{3+}$ is mixed with the remaining luminescent materials of the luminescent layer. In fact such a lamp can be manufactured in a simple manner because the absorption means can be provided in the lamp together with the luminescent layer in one processing step.

In another embodiment of a lamp according to the invention, the garnet activated by $Ce^{3+}$ is provided on the inner side of the lamp envelope as an absorption layer, on which the luminescent layer is disposed on the side facing the discharge. Especially at very low colour temperatures, higher luminous fluxes can be obtained with such lamps than in the case of the use of a mixture of the luminescent materials and the garnet.

A very advantageous embodiment of a lamp according to the invention is characterized in that material b is a luminescent aluminate activated by bivalent europium corresponding to the formula $$Sr_{1-q-r}Ca_qEu_rAl_sO_{1\frac{1}{2}s+1},$$

in which $$0 \leqq q \leqq 0.25,$$

$$0.001 \leqq r \leqq 0.10 \text{ and}$$

$$2 \leqq s \leqq 5,$$

which aluminate has its emission maximum at 485–495 nm and has a half-value width of 55–75 nm. The colour point of the radiation emitted by such an aluminate has the coordinates x=0.152 and y=0.360. The said luminescent strontium aluminates are described more fully in Dutch Patent Application No. 8201943 (PHN 10347). They fully satisfy the imposed condition of an emission having a comparatively narrow band with a maximum in the range of 470 to 500 nm. Furthermore, these materials luminesce very efficiently and can be subjected for a long time to high loads in lamps and then exhibit only a very small decrease in luminous flux.

Another favourable embodiment of a lamp according to the invention is characterized in that the material b is a luminescent aluminate activated by bivalent europium corresponding to the formula $$Ba_{1-t-r}Sr_tEu_rAl_sO_{1\frac{1}{2}s+1},$$

in which $$0 \leqq t \leqq 0.25,$$

$$0.005 \leqq r \leqq 0.25 \text{ and}$$

$$5 \leqq s \leqq 10,$$

which aluminate has its emission maximum at 475–485 nm and has a half-value width of 70–90 nm. The colour point of the radiation emitted by such a barium aluminate has the coordinates $x=0.161$ and $y=0.242$. These luminescent barium aluminates are described more fully in Dutch Patent Application No. 8105739 (PHN 10220). These aluminates also fully satisfy the condition of an emission having a comparatively narrow band with a maximum in the range of 470–500 nm. These materials are very efficiently luminescing materials which have a high maintenance of the luminous flux during the life of the lamp and can be subjected to high loads in lamps.

A still further advantageous embodiment of a lamp according to the invention is characterized in that the material b is a luminescent borate phosphate activated by bivalent europium corresponding to the formula $$m(Sr_{1-v-w-z}Ba_vCa_wEu_z)O.(1-n)P_2O_5.n(B_2O_3),$$

in which $$0 \leqq v \leqq 0.5$$

$$0 \leqq w \leqq 0.2$$

$$0.001 \leqq z \leqq 0.15$$

$$1.75 \leqq m \leqq 2.30$$

$$0.05 \leqq n \leqq 0.23,$$

which borate phosphate has its emission maximum at 470–485 nm and has a half-value width of 80–90 nm. The colour point of the radiation emitted by such a borate phosphate has the coordinates $x=0.191$ and $y=0.308$. These luminescent borate phosphates are known from the aforementioned German Patent Application No. 2848726. They have a tetragonal crystal structure and prove to be efficiently luminescing materials having an emission which is very suitable for lamps according to the invention.

DETAILED DESCRIPTION OF THE PREFERRED EMBODIMENTS

Figure 1:
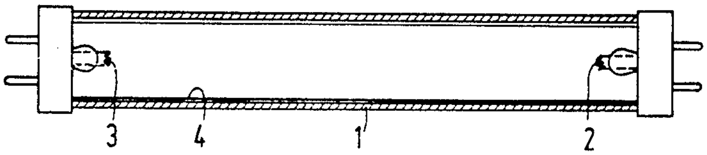
FIG. 1 shows diagrammatically and partly in section a low-pressure discharge lamp of the invention.

Embodiments of lamps according to the invention will now be described more fully with reference to the drawings.

In the drawings,

FIG. 1 shows diagrammatically and in sectional view a low-pressure mercury vapour discharge lamp according to the invention, In FIG. 1, reference numeral 1 denotes the glass wall of the low-pressure mercury vapour discharge lamp. At the ends of the lamp are arranged electrodes 2 and 3 between which the discharge takes place during operation of the lamp. The lamp is provided with rare gas which serves as ignition gas and further with a small quantity of mercury. The lamp has a length of 120 cm and an inner diameter of 24 mm and is intended to consume during operation a power of 36 w. The wall 1 is coated on the inner side with a luminescent layer 4 which comprises the luminescent materials a, b, c and, optionally d. The layer 4 further comprises means for absorbing blue radiation in the form of a quantity of garnet mixed with the luminescent materials. The layer 4 can be provided on the wall 1 in a conventional manner, for example, by means of a suspension comprising the luminescent materials.

Figure 2:
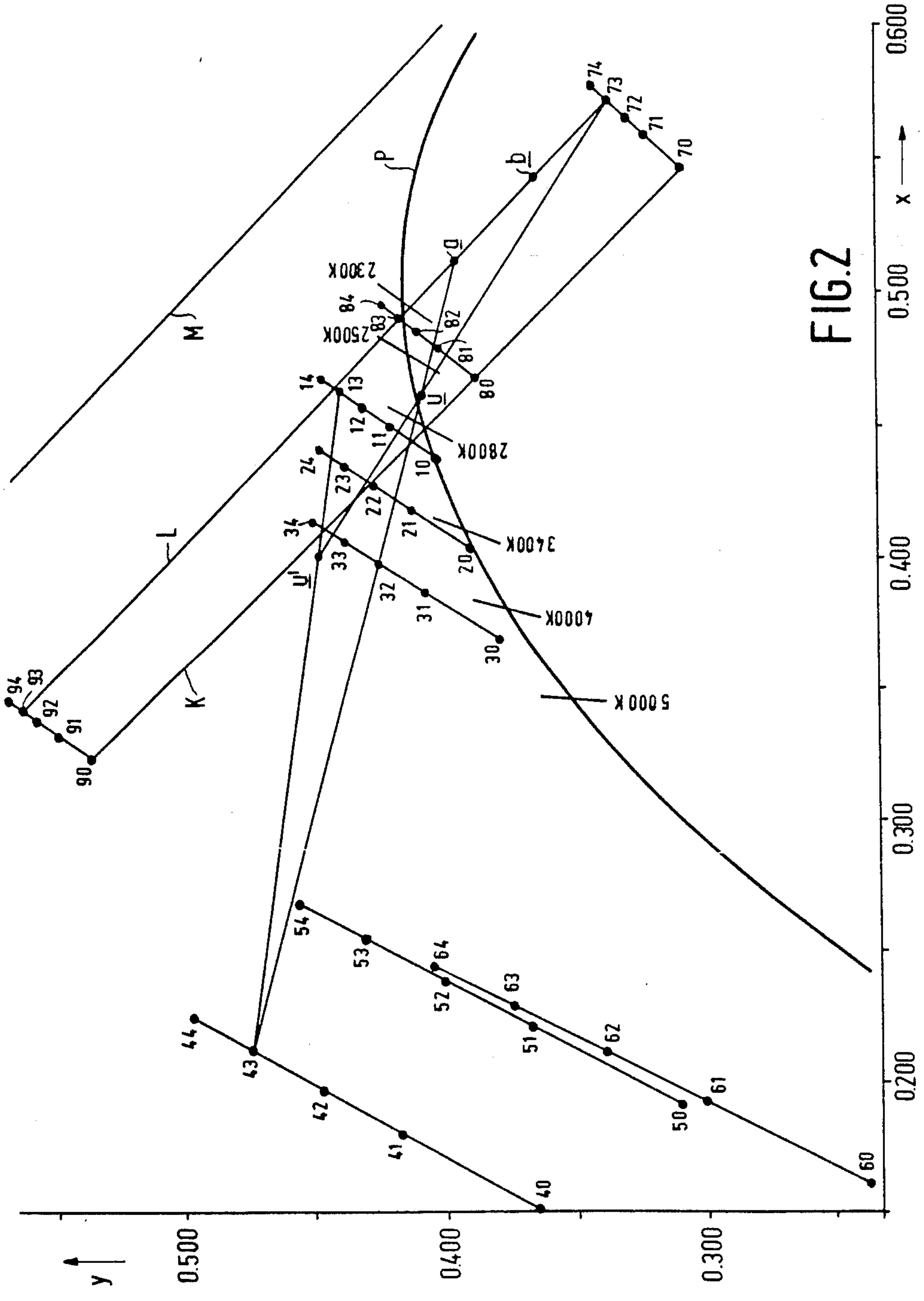
FIG. 2 is a graph showing coordinates of various luminescent materials and lamps of the prior art and of the invention in a part of the color triangle.

For further explanation reference is now made to FIG. 2 of the drawings. In this Figure, a part of the colour triangle is represented in the (x,y) colour coordinate plane. The x coordinate is plotted on the abscissa and the y coordinate of the colour point is plotted on the ordinate. Of the sides of the colour triangle itself, on which the colour points of monochromatic radiation are located, only the part indicated by M is visible in FIG. 2. The Figure shows the Planckian curve designated by P. Colour points of constant colour temperature are located on lines intersecting the curve P. A number of these lines are drawn and indicated by the associated colour temperature: 2300 K., 2500 K., . . . 5000 K. In FIG. 2, numerals and letters further designate the colour point of a number of lamps and luminescent materials. In the present description and the appended claims, the expression "colour point of a luminescent material" is to be understood to mean the colour point of a low-pressure mercury vapour discharge lamp which has a length of approximately 120 cm and an inner diameter of approximately 24 mm and is operated with a consumed power of 36 W, which lamp is provided with a luminescent layer which only comprises the said luminescent material, the layer thickness being chosen to have an optimum value with regard to the relative luminous flux. Therefore, with the colour points of luminescent materials, the influence of the visible radiation emitted by a low-pressure mercury vapour discharge itself is invariably taken into account. It should be noted that the value of the luminous efficiency of the luminescent material as yet has a slight influence on the location of the colour point. The use of the luminescent materials in other low-pressure mercury vapour discharge lamps than the said 36 W-type will generally yield only a very small shift of the colour points with respect to those shown here.

In FIG. 2 reference numeral 70 denotes the colour point of a red-luminescing Ce- and Mn-activated metaborate having the colour coordinates (x; y)= (0.545;

0.308). Reference numeral 90 denotes the colour point of a green-luminescing Ce- and Tb-activated metaborate (colour coordinates x=0.323 and y=0.537). The points designated by reference numerals 40, 50 and 60 are the colour points of three luminescent materials activated by bivalent europium with an emission maximum between 470 and 500 nm. The graph of FIG. 2 further includes the colour points of a number of conventional calcium halophosphates emitting white light and having different colour temperatures (the points 10, 20 and 30 having colour temperatures of 2945, 3565 and 4335 K., respectively). Other colour temperatures are possible by variation in the Sb:Mn ratio, but also by the use of mixtures of halophosphates.

If a given luminescent material is used in a lamp together with a means for absorbing blue radiation, the colour point of the emitted radiation performs a shift due to the blue absorption. In FIG. 2, this shift is shown for the luminescent materials indicated above when use is made of an yttrium aluminium garnet activated by $Ce^{3+}$ corresponding to the formula $Y_{2.9}Ce_{0.1}Al_5O_{12}$ as blue absorbing means. This garnet is provided in the lamp as an absorption layer on the inner wall of the lamp envelope. The luminescent layer comprising the relevant luminescent material is applied to this absorption layer at the surface facing the discharge. With the use of the luminescent garnet, the colour point of the lamp is shifted not only due to absorption, but also due to the contribution of the garnet emission to the emitted radiation. The value of the shift depends not only upon the specific composition of the relevant garnet, but of course also upon the thickness of the absorption layer. A measure for the absorption of the aforementioned garnet with a given layer thickness can be found in the influence exerted by the absorption layer on the colour point of white halophosphate. (colour temperature 4335 K., point 30 in FIG. 2). In the following Table 1, the colour points are given of lamps comprising this halophosphate and absorption layers of the said garnet with different layer thicknesses. The layer thickness is given in gms per lamp (36 W-type, length 120 cm, diameter 24 mm).

TABLE I

| colour point | x | y | layer thickness garnet in gms per lamp |
|---|---|---|---|
| 30 | 0.368 | 0.379 | 0 |
| 31 | 0.387 | 0.408 | 0.36 |
| 32 | 0.397 | 0.424 | 0.60 |
| 33 | 0.406 | 0.438 | 0.84 |
| 34 | 0.414 | 0.451 | 1.08 |

In the first column of Table 1, under the heading "Colour point" the reference numeral of FIG. 2 is indicated which denotes the colour point in the colour triangle. In FIG. 2, the points 30, 31, 32, 33 and 34 are interconnected by a line, which clearly indicates the shift. Of the remaining aforementioned luminescent materials, whose colour point is indicated in FIG. 2, the shift of the colour point is also shown with the use of an absorption layer of the same garnet with the same layer thicknesses (0.36 . . . 1.08 g per lamp). These points are also interconnected by a line for each luminescent material (see 20, 21, 22, 23, 24 and further 10–14, 40–44, 50–54, 60–64, 70–74 and 90–94).

With the use of two luminescent materials in a lamp, all the colour points can be reached which are located on the connection line of the colour points of the two materials chosen. By way of example, in FIG. 2 the connection line K of the colour point 70 (red-luminescing Ce- and Mn-activated metaborate) and 90 (green-luminescing Ce- and Tb-activated metaborate) is shown. The location of the colour point on the line K of lamps provided with only the materials 70 and 90 is invariably determined by the relative quantum contributions of the materials 70 and 90 to the radiation emitted by the lamp. The distance of the colour point of the lamp (for example the point 80) to the point 70 divided by the distance between the points 70 and 90 is in fact proportional to the relative quantum contribution of the material 90 and to the relative luminous flux (lm/W) produced by the material 90 if it is provided in the lamp as the only luminescent material and further inversely proportional to the y coordinate of the colour point of the material 90. An analogous relation applies to the distance of the colour point 80 to the point 90. With the use of given materials 70 and 90 (for which consequently the relative luminous flux and the y coordinate are fixed) therefore only the relative quantum contributions determine the colour point of the lamp. For these materials 70 and 90, the required relative quantum contributions are then known if a certain colour point of the lamp is desired. These quantum contributions are in the first instance a measure of the quantities of the materials 70 and 90 to be used. When determining these quantities, the quantum efficiency and the absorption of exciting radiation of the materials 70 and 90 and further factors, such as, for example, the grain size of the materials used, should be taken into account. In general, it will be desirable to check on a few test lamps whether or not the desired relative quantum contributions are attained with a particular choice of the quantities of the luminescent materials. In FIG. 2, the shift of the colour point 80 of a given mixture of the materials 70 and 90 is indicated if absorbing layers of the aforementioned garnet are used in layer thicknesses as stated in Table 1. With a layer thickness of, for example, 0.84 g per lamp, the point 83 is attained. By variation in the relative quantum contributions of the red-luminescing and the green-luminescing materials, all the colour points on the connection line L of the points 73 and 93 can be obtained.

In FIG. 2, for illustration, the colour point u of a lamp according to the invention is indicated, which lamp has a colour temperature of 2660 K. and a colour point x=0.462 and y=0.409 (substantially on the curve P). It appears from the location of the colour point u with respect to the points 70 and 90 of the metaborates, the points 10, 20 and 30 of the halophosphates and the points 40, 50 and 60 of the materials activated by $Eu^{2+}$ that the lamp u cannot be manufactured with these luminescent materials if no absorption means are utilized. However, this lamp can be obtained with, for example, an absorption layer of the aforementioned garnet of 0.84 g per lamp and a combination of the luminescent materials mentioned above in connection with the colour point 10, 40, 70 and 90 in FIG. 2. Due to the absorption layer, the colour points of these materials are shifted to 13, 43, 73 and 93, respectively. If no green-luminescing material (colour point 93) is used, the relative quantum contributions of 13 and 43 are fixed. These contributions in fact have then to be chosen so that the colour point u' is reached, u' being located on the connection line of 73 with u. By a suitable choice of the relative quantum contributions of 73 and of the combination u' the colour point u is reached. If as the fourth constituent the green-luminescing terbium-activated material is added to the luminescent layer, it is found that the ratio of the relative quantum contributions of 93 and 73 (93:73) is determined by the chosen ratio of the relative quantum contributions of 43 and 13 (43:13). According as the ratio 43:13 is larger, the ratio 93:73 also becomes larger in such a manner that the colour point obtained with 93 and 73 lies on the connection line of the colour point obtained with 43 and 13 and the point u. The largest ratio of 93:73 with which it is possible to reach the colour point u is indicated in FIG. 2 by the point a. In this case, however, the luminescent layer does not contain any halophosphate. although with all the ratios 93:73 with colour points between the points 73 and a and located on the connection line L, the colour point u can be obtained by combination with 43 and 13, in general not every combination will lead to a lamp with an R(a,8) value of at least 85. Especially in those cases in which the contribution of the halophosphate is zero or very small, the lamp will not satisfy the requirements imposed. The range of 93:73 ratios with which lamps according to the invention are obtained can be determined with reference to a few test lamps. It has been found, for example, that the point b yields for the combination of 93 and 73 a lamp having a colour point u having an R(a,8) value of 95. The presence of such a range between 73 and a offers the advantage that optimization of the lamp is quite possible.

For further illustration, data are now given of nine series of lamps according to the invention, which are all of the 36 W-type described with reference to FIG. 1 and in which invariably use is made of an absorption layer disposed on the inner wall of the lamp envelope and consisting of the aforementioned garnet $Y_{2.9}Ce_{0.1}Al_5O_{12}$. The luminescent layer disposed on the absorption layer comprises a mixture of luminescent materials chosen from the group of materials indicated in Table 2. Table 2 gives for each material a number by which the material will further be indicated, the formula, the colour coordinates x and y of the relevant material and the relative luminous flux $\eta$ (in lumen/W) obtained if the material (as the only luminescent material) is provided in lamps of the 36 W-type. Numbers 400, 500 and 600 are blue-luminescing materials activated by $Eu^{2+}$; numbers 100, 200 and 300 are luminescent halophosphates; numbers 701 to 708 inclusive are Ce-, Tb- and Mn-activated metaborates and number 700 is a Ce- and Mn-activated metaborate.

TABLE 2

| Nr. | formula | x | y | $\eta$ |
|---|---|---|---|---|
| 400 | $Sr_{0.98}Eu_{0.02}Al_{3.5}O_{6.25}$ | 0.151 | 0.364 | 82 |
| 500 | $2(Sr_{0.94}Eu_{0.06}O).0.833P_2O_5.0.167B_2O_3$ | 0.191 | 0.308 | 77 |
| 600 | $Ba_{0.95}Eu_{0.05}Al_{8.10}O_{13.15}$ | 0.161 | 0.238 | 66 |
| 100 | $Ca_{9.33}Cd_{0.12}(PO_4)_6F_{1.7}Cl_{0.4}$; $Sb_{0.125}Mn_{0.35}$ | 0.437 | 0.402 | 84 |
| 200 | $Ca_{9.454}Cd_{0.04}(PO_4)_6F_{1,69}Cl_{0.288}$; $Sb_{0.09}Mn_{0.256}$ | 0.402 | 0.389 | 86 |
| 300 | $Ca_{9.524}Cd_{0.04}(PO_4)_6F_{1.73}Cl_{0.226}$; $Sb_{0.09}Mn_{0.186}$ | 0.368 | 0.379 | 82 |
| 708 | $Ce_{0.2}Gd_{0.6}Tb_{0.2}Mg_{0.95}Mn_{0.05}B_5O_{10}$ | 0.477 | 0.390 | 56 |
| 707 | $Ce_{0.2}Gd_{0.6}Tb_{0.2}Mg_{0.94}Mn_{0.06}B_5O_{10}$ | 0.488 | 0.378 | 54 |
| 706 | $Ce_{0.2}Gd_{0.6}Tb_{0.2}Mg_{0.93}Mn_{0.07}B_5O_{10}$ | 0.498 | 0.363 | 50 |
| 705 | $Ce_{0.2}Gd_{0.6}Tb_{0.2}Mg_{0.92}Mn_{0.08}B_5O_{10}$ | 0.508 | 0.356 | 48 |
| 704 | $Ce_{0.2}Gd_{0.7}Tb_{0.1}Mg_{0.92}Mn_{0.08}B_5O_{10}$ | 0.513 | 0.351 | 46 |
| 703 | $Ce_{0.2}Gd_{0.6}Tb_{0.2}Mg_{0.91}Mn_{0.09}B_5O_{10}$ | 0.518 | 0.345 | 46 |
| 702 | $Ce_{0.2}Gd_{0.6}Tb_{0.2}Mg_{0.90}Mn_{0.10}B_5O_{10}$ | 0.523 | 0.342 | 41 |
| 701 | $Ce_{0.2}Gd_{0.6}Tb_{0.2}Mg_{0.88}Mn_{0.12}B_5O_{10}$ | 0.530 | 0.334 | 40 |
| 700 | $Ce_{0.2}Gd_{0.8}Mg_{0.88}Mn_{0.12}B_5O_{10}$ | 0.545 | 0.309 | 34 |

For each of the said nine series of lamps, there is indicated hereinafter in Tables 3 to 11 inclusive which values of R(a,8) are reached. In the heading of each Table, the colour temperature $T_c$ and the colour coordinates x and y of the relevant lamps are indicated. Furthermore, it is indicated therein which blue-luminescing material activated by $Eu^{2+}$ and which halophosphate (from Table 2) are used. The vertical columns relate to the luminescent metaborate (indicated by the number from Table 2) which is used in the lamp. The horizontal lines in the Tables each relate to a given layer thickness of the garnet absorption layer (expressed in g per lamp). If for a given combination of garnet layer thickness and luminescent metaborate no value for R(a,8) is indicated in the Tables, this means that the relevant lamp with a value R(a,8) of at least 85 could not be obtained. By way of example, in both Tables 3 and 7 for a given combination of the luminescent materials there is indicated in the Tables which results are attained if the garnet absorption layer is replaced by an absorption layer of the yellow pigment nickel titanate. In general it has been found that a slightly higher R(a,8) value is possible, but at the expense of the relative luminous flux.

TABLE 3

Lamps with $T_c$ = 2660K x = 0.462 y = 0.409
With lum. materials nos. 400 and 100
Values of R(a,8)

| layer thickness garnet (g per lamp) | luminescent metaborate no. 708 | 707 | 706 | 705 | 704 | 703 | 702 | 701 | 700 |
|---|---|---|---|---|---|---|---|---|---|
| 0.36 | 87 | | | | | | | | |
| 0.42 | 88 | | | | | | | | |
| 0.48 | | 86 | | | | | | | |
| 0.54 | | 91* | | | | | | | |
| 0.60 | | 90 | 87 | | | | | | |
| 0.66 | | | 92 | 89 | 87 | 85 | | | |
| 0.72 | | | 94 | 94 | 92 | 90 | 89 | 87 | |
| 0.78 | | | 89 | 94 | 95 | 94 | 94 | 91 | |
| 0.84 | | | | 90 | 93 | 94 | 95 | 95 | 88 |
| 0.90 | | | | | 88 | 92 | 92 | 94 | 92 |
| 0.96 | | | | | | 87 | 88 | 92 | 95 |
| 1.02 | | | | | | | | 87 | 94 |
| 1.08 | | | | | | | | | 92 |
| 1.14 | | | | | | | | | 89 |
| 1.20 | | | | | | | | | 85 |

*Relative luminous flux 64 lumen/W.

If with the same combination of luminescent materials (400, 100 and 707), the garnet layer is replaced by a nickel titanate absorption layer (thickness 0.115 $mg/cm^2$), a relative luminous flux of 58 lm/W and an R(a,8) value of 93 is found.

Lamps with $T_c$ = 2660K x = 0.462 y = 0.409.
With lum. materials nos. 400 and 200
Values of R(a,8).

| layer thickness garnet (g per lamp) | luminescent metaborate no. 708 | 807 | 706 | 705 | 704 | 703 | 702 | 701 | 700 |
|---|---|---|---|---|---|---|---|---|---|
| 0.42 | 87 | | | | | | | | |
| 0.48 | | | | | | | | | |
| 0.54 | | | | | | | | | |
| 0.60 | | 91 | | | | | | | |
| 0.66 | | | 85 | | | | | | |
| 0.72 | | | 92 | 87 | | | | | |
| 0.78 | | | 92 | 93 | 90 | 87 | 86 | | |
| 0.84 | | | | 92 | 95 | 93 | 93 | 89 | |
| 0.90 | | | | 86 | 91 | 94 | 94 | 95 | 86 |
| 0.96 | | | | | | 89 | 90 | 94 | 91 |

-continued

Lamps with $T_c$ = 2660K x = 0.462 y = 0.409.
With lum. materials nos. 400 and 200
Values of R(a,8).

| layer thickness garnet (g per lamp) | luminescent metaborate no. | | | | | | | | |
|---|---|---|---|---|---|---|---|---|---|
| | 708 | 807 | 706 | 705 | 704 | 703 | 702 | 701 | 700 |
| 1.02 | | | | | | | | 89 | 93 |
| 1.08 | | | | | | | | | 93 |
| 1.14 | | | | | | | | | 90 |
| 1.20 | | | | | | | | | 87 |

TABLE 5

Lamps with $T_c$ = 2660K x = 0.462 y = 0.409.
With lum. materials nos. 400 and 300
Values of R(a,8)

| layer thickness garnet (g per lamp) | luminescent metaborate no. | | | | | | | | |
|---|---|---|---|---|---|---|---|---|---|
| | 708 | 707 | 706 | 705 | 704 | 703 | 702 | 701 | 700 |
| 0.78 | | | 92 | 85 | | | | | |
| 0.84 | | | 86 | 93 | 90 | 85 | | | |
| 0.90 | | | | 88 | 93 | 93 | 92 | 88 | |
| 0.96 | | | | | 85 | 92 | 93 | 95 | |
| 1.02 | | | | | | | 86 | 92 | 89 |
| 1.08 | | | | | | | | 85 | 95 |
| 1.14 | | | | | | | | | 93 |
| 1.20 | | | | | | | | | 89 |

TABLE 6

Lamps with $T_c$ = 2930K x = 0.439 y = 0.400.
With lum. materials nos. 400 and 100
Values of R(a,8)

| layer thickness garnet (g per lamp) | luminescent metaborate no. | | | | | | | | |
|---|---|---|---|---|---|---|---|---|---|
| | 708 | 707 | 706 | 705 | 704 | 703 | 702 | 701 | 700 |
| 0.24 | 86 | 88 | | | | | | | |
| 0.30 | | 94 | 85 | | | | | | |
| 0.36 | | 89 | 92 | 89 | 87 | 85 | | | |
| 0.42 | | | 95 | 94 | 92 | 90 | 90 | 88 | |
| 0.48 | | | 90 | 95 | 96 | 95 | 95 | 93 | 86 |
| 0.54 | | | | 90 | 93 | 95 | 95 | 96 | 91 |
| 0.60 | | | | | 87 | 91 | 91 | 94 | 94 |
| 0.66 | | | | | | 85 | 86 | 90 | 95 |
| 0.72 | | | | | | | | | 92 |

TABLE 7

Lamps with $T_c$ = 2930K x = 0.439 y = 0.400.
With lum. materials nos. 400 and 200
Values of R(a,8)

| layer thickness garnet (g per lamp) | luminescent metaborate no. | | | | | | | | |
|---|---|---|---|---|---|---|---|---|---|
| | 708 | 707 | 706 | 705 | 704 | 703 | 702 | 701 | 700 |
| 0.24 | 89 | | | | | | | | |
| 0.30 | | | | | | | | | |
| 0.36 | | 93 | | | | | | | |
| 0.42 | | | 89 | 85 | | | | | |
| 0.48 | | | 94 | 93* | 90 | 87 | 86 | | |
| 0.54 | | | 86 | 93 | 96 | 94 | 93 | 90 | |
| 0.60 | | | | 86 | 90 | 94 | 95 | 96 | 88 |
| 0.66 | | | | | | 88 | 89 | 93 | 93 |
| 0.72 | | | | | | | | 87 | 95 |

*Relative luminous flux 66 lm/W.

If with the same combination of luminescent materials (400, 200 and 705), the garnet layer is replaced by a nickel titanate absorption layer (thickness 0.115 mg/cm$^2$), a relative luminous flux of 59 lm/W and an R(a,8) value of 96 are found.

TABLE 8

Lamps with $T_c$ = 2930K x = 0.439 y = 0.400.
With lum. materials nos. 400 and 300
Values of R(a,8)

| layer thickness garnet (g per lamp | luminescent metaborate no. | | | | | | | | |
|---|---|---|---|---|---|---|---|---|---|
| | 708 | 707 | 706 | 705 | 704 | 703 | 702 | 701 | 700 |
| 0.48 | | | 89 | | | | | | |
| 0.54 | | | 89 | 92 | 88 | | | | |
| 0.60 | | | | 89 | 94 | 93 | 92 | 88 | |
| 0.66 | | | | | 85 | 91 | 93 | 95 | |
| 0.72 | | | | | | | | 90 | 91 |

TABLE 9

Lamps with $T_c$ = 2660K x = 0.462 y = 0.409.
With lum. materials nos. 500 and 100
Values of R(a,8).

| layer thickness garnet (g per lamp) | luminescent metaborate no. | | | | | | | | |
|---|---|---|---|---|---|---|---|---|---|
| | 708 | 707 | 706 | 705 | 704 | 703 | 702 | 701 | 700 |
| 0.42 | 95 | | | | | | | | |
| 0.48 | 89 | | | | | | | | |
| 0.54 | 87 | | | | | | | | |
| 0.60 | | 86 | | | | | | | |
| 0.66 | | 90 | | | | | | | |
| 0.72 | | 91 | 86 | | | | | | |
| 0.78 | | 88 | 90 | 87 | 85 | | | | |
| 0.84 | | | 93 | 90 | 88 | 86 | 86 | | |
| 0.90 | | | 92 | 93 | 92 | 90 | 89 | 87 | |
| 0.96 | | | 89 | 94 | 94 | 93 | 93 | 91 | 85 |
| 1.02 | | | | 90 | 93 | 95 | 95 | 94 | 88 |
| 1.08 | | | | 86 | 90 | 93 | 93 | 95 | 91 |
| 1.14 | | | | | 85 | 89 | 90 | 93 | 93 |
| 1.20 | | | | | | | 86 | 89 | 95 |

TABLE 10

Lamps with $T_c$ = 2930K x = 0.439 y = 0.400
With lum. materials nos. 500 and 200
Values of R(a,8)

| layer thickness garnet (g per lamp) | luminescent metaborate no. | | | | | | | | |
|---|---|---|---|---|---|---|---|---|---|
| | 708 | 707 | 706 | 705 | 704 | 703 | 702 | 701 | 700 |
| 0.30 | 88 | | | | | | | | |
| 0.36 | 89 | | | | | | | | |
| 0.42 | | 87 | | | | | | | |
| 0.48 | | 92 | | | | | | | |
| 0.54 | | 90 | 89 | 86 | | | | | |
| 0.60 | | 85 | 93 | 90 | 88 | 86 | 86 | | |
| 0.66 | | | 92 | 94 | 92 | 90 | 90 | 88 | |
| 0.72 | | | 88 | 93 | 95 | 94 | 94 | 92 | 86 |
| 0.78 | | | | 89 | 92 | 94 | 95 | 95 | 90 |
| 0.84 | | | | | 87 | 90 | 92 | 94 | 94 |
| 0.90 | | | | | | 85 | 87 | 90 | 95 |
| 0.96 | | | | | | | | 86 | 94 |
| 1.02 | | | | | | | | | 91 |
| 1.08 | | | | | | | | | 87 |

TABLE 11

| Lamps with $T_c$ = 2930K x = 0.439 y = 0.400. With lum. materials nos. 600 and 100 Values of R(a,8) | | | | | | | | | |
|---|---|---|---|---|---|---|---|---|---|
| layer thickness garnet (g per lamp) | luminescent metaborate no. | | | | | | | | |
| | 708 | 707 | 706 | 705 | 704 | 703 | 702 | 701 | 700 |
| 0.42 | 86 | | | | | | | | |
| 0.48 | 89 | | | | | | | | |
| 0.54 | 90 | | | | | | | | |
| 0.60 | 87 | 88 | | | | | | | |
| 0.66 | | 91 | 85 | | | | | | |
| 0.72 | | 92 | 88 | 86 | | | | | |
| 0.78 | | 90 | 91 | 89 | 87 | 86 | 95 | | |
| 0.84 | | 87 | 94 | 92 | 90 | 89 | 88 | 87 | |
| 0.90 | | | 93 | 94 | 93 | 92 | 91 | 90 | 86 |
| 0.96 | | | 90 | 94 | 95 | 95 | 94 | 93 | 88 |
| 1.02 | | | 86 | 91 | 94 | 95 | 95 | 95 | 91 |
| 1.08 | | | | 88 | 91 | 93 | 94 | 95 | 94 |
| 1.14 | | | | | 87 | 90 | 91 | 93 | 95 |
| 1.20 | | | | | | 86 | 87 | 90 | 95 |

In the following examples of lamps according to the invention, use was made of luminescent materials which have been described already in Table 2 and which will be denoted by the number given therein. Furthermore, the aforementioned garnet ($Y_{2.9}Ce_{0.1}Al_5O_{12}$) was used as absorption means in the form of an absorption layer or mixed with the remaining luminescent materials. If not stated otherwise, the lamps are of the type described with reference to FIG. 1 (36 W-type).

EXAMPLE 1

A lamp was provided with a garnet absorption layer (1.8 g per lamp) on which a luminescent layer (layer thickness approximately 4.2 g per lamp) was disposed comprising a homogeneous mixture of 24.5% by weight of no. 600
7.3% by weight of no. 100
7.3% by weight of no. 300
60.9% by weight of no. 700.

The colour temperature $T_c$ (in K.), the colour point (x,y), the colour rendering index R(a,8) and the relative luminous flux $\eta$ (in lm/W) of the lamp were measured

| | | |
|---|---|---|
| $T_c$ = 2380K | x = 0.486 | y = 0.412 |
| R(a,8) = 92 | $\eta$ = 55 lm/W. | |

EXAMPLE 2

A lamp was provided with a garnet absorption layer (0.9 g per lamp) on which a luminescent layer (layer thickness approximately 4.2 g per lamp) was disposed comprising a homogeneous mixture of 15.1% by weight of no. 400
27.1% by weight of no. 200
57.8% by weight of no. 702.

There were measured:

| | | |
|---|---|---|
| $T_c$ = 2670K | x = 0.463 | y = 0.412 |
| R(a,8) = 94 | $\eta$ = 55 lm/W. | |

EXAMPLE 3

A lamp was provided with a luminescent layer (approximately 4.3 g per lamp) of a homogeneous mixture of:

14% by weight of no. 400
36.3% by weight of no. 100
49.7% by weight of no. 703, to which was added 4 g of garnet ($Y_{2.9}Ce_{0.1}Al_5O_{12}$) per 100 g of the homogeneous mixture. There were measured:

| | | |
|---|---|---|
| $T_c$ = 2940K | x = 0.438 | y = 0.399 |
| R(a,8) = 92 | $\eta$ = 66 lm/W. | |

EXAMPLE 4

A lamp having a length of 150 cm and an inner diameter of 26 mm suitable for operation at 58 W was provided with the same luminescent layer as described in Example 3 (layer thickness approximately 5.4 g per lamp). There were measured:

| | | |
|---|---|---|
| $T_c$ = 3040K | x = 0.435 | y = 0.405 |
| R(a,8) = 91 | $\eta$ = 67 lm/W. | |

EXAMPLE 5

A lamp was provided with a luminescent layer (approximately 4.3 g per lamp) of a homogeneous mixture of:

17% by weight of no. 400
35% by weight of no. 100
48% by weight of no. 703 to which was added 5 g of garnet per 100 g, of the homogeneous mixture.

There were measured:

| | | |
|---|---|---|
| $T_c$ = 3090K | x = 0.433 | y = 0.407 |
| R(a,8) = 94 | $\eta$ = 67 lm/W. | |

EXAMPLE 6

A lamp was provided with a luminescent layer (approximately 4.3 g per lamp) of a homogeneous mixture of 13.3% by weight of no. 400
25.6% by weight of no. 100
61.1% by weight of no. 703, to which was added 7 g of garnet per 100 g of the homogeneous mixture.

There were measured:

| | | |
|---|---|---|
| $T_c$ = 2690K | x = 0.458 | y = 0.406 |
| R(a,8) = 96 | $\eta$ = 61 lm/W. | |

Figure 3:
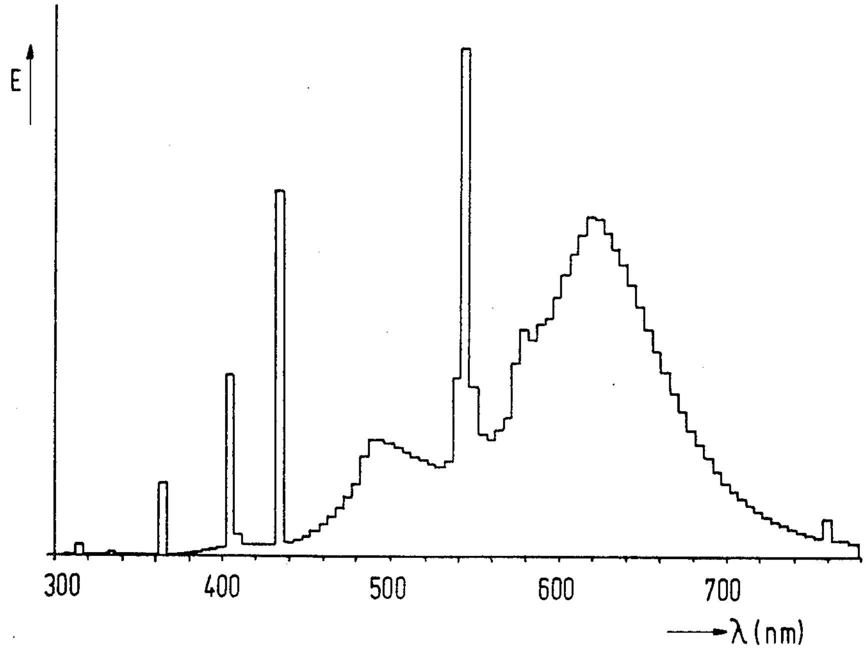
FIG. 3 is a graph showing the spectral energy distribution of a lamp of the invention.

The spectral energy distribution of the emitted radiation of this lamp is shown in FIG. 3. In this Figure, the wavelength $\lambda$ in nm is plotted on the abscissa. The emitted radiation energy E per wavelength interval of 5 nm is plotted on the ordinate.

EXAMPLE 7

A lamp was provided with a luminescent layer (approximately 4.3 g per lamp) of a homogeneous mixture of 13.3% by weight of no. 400
25.6% by weight of no. 100
61.1% by weight of no. 703,
to which was added 9 g of garnet per 100 g of the homogeneous mixture.

There were measured:

| | | |
|---|---|---|
| $T_c$ = 2680K | x = 0.462 | y = 0.412 |
| R(a,8) = 95 | $\eta$ = 62 lm/W. | |

EXAMPLE 8

A lamp was provided with a first luminescent layer (approximately 1.82 g per lamp) of a homogeneous mixture of 99% by weight of no. 100 and 1% by weight of garnet.

A second luminescent layer (approximately 2.06 g per lamp) was provided on the first layer, said second layer consisting of a homogeneous mixture of 12.7% by weight of no. 400
24.9% by weight of no. 100
62.4% by weight of no. 707, to which was added
1.5 g of garnet per 100 g of the homogeneous mixture.

There were measured:

| | | |
|---|---|---|
| $T_c$ = 2970K | x = 0.435 | y = 0.396 |
| R(a,8) = 93 | $\eta$ = 68 lm/W. | |

EXAMPLE 9

A lamp was provided with a first luminescent layer (approximately 2.02 g per lamp) of a homogeneous mixture of 1.77 g of no. 100 and 0.25 g of garnet. A second luminescent layer (approximately 2.13 g per lamp) was provided on the first layer, said second layer consisting of a homogeneous mixture of 20.5% by weight of no. 400
35.5% by weight of no. 100
44% by weight of no. 703.

There were measured:

| | | |
|---|---|---|
| $T_c$ = 3004K | x = 0.434 | y = 0.399 |
| R(a,8) = 95 | $\eta$ = 68 lm/W. | |

EXAMPLE 10

A lamp as described in Example 9 was made, in which however the garnet from the first luminescent layer was left out and in which the mass of the first layer was approximately 1.98 g per lamp and the mass of the second layer was approximately 2.07 g per lamp. This lamp which did not contain means for absorbing blue radiation (not according to the invention) gave the following measuring results:

| | | |
|---|---|---|
| $T_c$ = 3238K | x = 0.410 | y = 0.373 |
| R(a,8) = 92.5 | $\eta$ = 65 lm/W. | |

Then this lamp was provided at the outer surface of the envelope with a yellow-coloured polyester shrinkage foil (thickness approximately 50μ), which foil was mainly absorbing radiation having wavelengths below 450 nm. In this manner provided with absorption means this lamp according to the invention gave the following measuring results:

| | | |
|---|---|---|
| $T_c$ = 3016K | x = 0.442 | y = 0.416 |
| R(a,8) = 92.3 | $\eta$ 58 lm/W. | |

We claim:

1. A low-pressure mercury vapor discharge lamp having a color rendering index R(a,8) of at least 85, a luminous flux of at least 55 l/mW a color temperature of the emitted white light in the range of 2300 to 3300 K. and a color point on or not greater than 20 Minimum Perceptible Color Difference from the point on the Planckian curve of the same color temperature and provided with a gas-tight radiation-transparent envelope containing mercury, a rare gas, a pair of spaced elctrodes for providing a discharge, a luminescent layer comprising:

a. at least one luminescent alkaline earth metal halophosphate activated by trivalent antimony and bivalent manganese and having a color temperature of the emitted radiation of 2900 to 5000 K.;

b. at least one luminescent material activated by bivalent europium with an emission maximum in the range of 470 to 500 nm and a half-value width of the emission band of at most 90 nm, and c. a luminescent rare earth metal metaborate activated by trivalent cerium and bivalent manganese, having a monoclinic crystal structure, whose fundamental lattice corresponds to the formula $Ln(Mg,Zn,Cd)B_5O_{10}$, in which Ln is at least one of the elements yttrium, lanthanum and gadolinium and in which up to 20 mol.% of the B can be replaced by Al and/or Ga, which metaborate exhibits its red $Mn^{2+}$ emission, and means for absorbing at least in part blue radiation having wavelengths below 480 nm.

2. A lamp as claimed in claim 1, wherein the luminescent layer further contains a luminescent material activated by trivalent terbium (material d), which exhibits green $Tb^{3+}$ emission.

3. A lamp as claimed in claim 2, wherein that the luminescent metaborate c is further activated by trivalent terbium, the metaborate c being at the same time the material d, and corresponds to the formula $$(Y,La,Gd)_{1-f-g}Ce_fTb_g(Mg,Zn,Cd)_{1-h}Mn_hB_5O_{10},$$

in which $0.01 \leq f \leq 1-g$ $0.01 \leq g \leq 0.75$ $0.01 \leq h \leq 0.30$ and in which up to 20 mol. % of the B is replaceable by Al and/or Ga.

4. A low-pressure mercury vapor discharge lamp as claimed in claim 3 wherein the color rendering index R(a,8) is at least about 90.

5. A lamp as claimed in claim 4, wherein the means for absorbing blue radiation is the radiation-transparent envelope of the lamp.

6. A lamp as claimed in claim 4, wherein the means for absorbing blue radiation is a yellow pigment.

7. A lamp as claimed in claim 6, wherein the pigment is mixed with the luminescent materials of the luminescent layer.

8. A lamp as claimed in claim 6, wherein the pigment is provided on the inner side of the lamp envelope as an absorption layer, on which the luminescent layer is disposed on the side facing the discharge.

9. A lamp as claimed in claim 1, wherein the means for absorbing blue radiation is a luminescent aluminate activated by trivalent cerium having a garnet crystal structure according to the formula $M_{3-j}Ce_jAl_{5-k-p}Ca_kSc_pO_{12}$, in which M is at least one of the elements yttrium, gadolinium, lanthanum and lutetium and in which $$0.01 \leqq j \leqq 0.15$$

$$0 \leqq k \leqq 3,$$

$$0 \leqq p \leqq 1.$$

10. A lamp as claimed in claim 9, wherein M is yttrium and k=p=0.

11. A lamp as claimed in claim 9, wherein the garnet activated by $Ce^{3+}$ is mixed with the remaining luminescent materials of the luminescent layer.

12. A lamp as claimed in claim 9, wherein the garnet activated by $Ce^{3+}$ is applied on the inner side of the lamp envelope as an absorption layer on which the luminescent layer is disposed on the side facing the discharge.

13. A lamp as claimed in claim 4, wherein the material b is a luminescent aluminate activated by bivalent europium corresponding to the formula $$Sr_{1-q-r}Ca_qEu_rAl_sO_{1\frac{1}{2}s+1},$$

in which $$0 \leqq q \leqq 0.25,$$

$$0.001 \leqq r \leqq 0.10 \text{ and}$$

$$2 \leqq s \leqq 5,$$

which aluminate has its emission maximum at 485–495 nm and has a half-value width of 55–75 nm.

14. A lamp as claimed in of claim 4, wherein the material b is a luminescent aluminate activated by bivalent europium corresponding to the formula $$Ba_{1-t-r}Sr_tEu_rAl_sO_{1\frac{1}{2}s+1}$$

in which $$0 \leqq t \leqq 0.25,$$

$$0.005 \leqq r \leqq 0.25 \text{ and}$$

$$5 \leqq s \leqq 10,$$

which aluminate has its emission maximum at 475–485 nm and has a half-value width of 70–90 nm.

15. A lamp as claimed in any one of claims 4 to 11, wherein the material b is a luminescent borate phosphate activated by bivalent europium corresponding to the formula $m(Sr_{1-v-w-z}Ba_vCa_wEu_zO).(1-n)P_2O_5.nB_2O_3$, in which $$0 \leqq v \leqq 0.5$$

$$0 \leqq w \leqq 0.2$$

$$0.001 \leqq z \leqq 0.15$$

$$1.75 \leqq m \leqq 2.30$$

$$0.05 \leqq n \leqq 0.23,$$

which borate-phosphate has its emission maximum at 470–485 nm and has a half-value width of 80–90 nm.

* * * * *